United States Patent [19]

Cargille

[11] Patent Number: 5,227,943
[45] Date of Patent: Jul. 13, 1993

[54] POWER FAULT PROTECTION FOR HIGH MOMENTUM SYSTEMS

[75] Inventor: Donald R. Cargille, Culver City, Calif.

[73] Assignee: Hughes Aircraft Company, Los Angeles, Calif.

[21] Appl. No.: 632,845

[22] Filed: Dec. 24, 1990

[51] Int. Cl.$^5$ .............................................. H02H 3/24
[52] U.S. Cl. ...................... 361/88; 361/101; 361/92; 388/903
[58] Field of Search ............... 318/150, 151, 161, 584, 318/585, 586, 145, 368, 459; 361/23, 88, 90, 91, 93, 92, 100, 101, 102; 363/34, 37, 50; 323/234; 388/903, 907.5, 928.1

[56] References Cited

U.S. PATENT DOCUMENTS

| 3,755,712 | 8/1973 | De Viney et al. |
| 3,772,568 | 11/1973 | Phillips. |
| 4,054,943 | 10/1977 | Mundt ................... 318/166 |
| 4,096,394 | 6/1978 | Ullmann et al. .............. 307/46 |
| 4,260,942 | 4/1981 | Fleming. |
| 4,339,779 | 7/1982 | Kalbach ...................... 361/33 |
| 4,412,267 | 10/1983 | Hansen ....................... 361/94 |
| 4,471,233 | 9/1984 | Roberts ...................... 307/66 |
| 4,508,974 | 4/1985 | Henderson ................. 307/66 |
| 4,620,296 | 10/1986 | Siemon ....................... 363/51 |
| 4,673,858 | 6/1987 | Saito ........................... 318/805 |
| 4,700,116 | 10/1987 | Inoue et al. ................ 318/254 |
| 4,707,774 | 11/1987 | Kajita ......................... 363/37 |

FOREIGN PATENT DOCUMENTS 0220713 5/1987 European Pat. Off. .

OTHER PUBLICATIONS

Proceedings of the 20th Intersociety Energy Conversion Engineering Conference vol. 2, Aug. 1985, Warrendale, pp. 2353–2360.
Design and Development of a High Efficiency Effector for the Control of Attitude and Power in Space Systems, O'Dea, et al., pp. 2357–2359.

Primary Examiner—Bentsu Ro
Attorney, Agent, or Firm—Gordon R. Lindeen, II; Wanda K. Denson-Low

[57] ABSTRACT

A power loss protection system for use in a system having a spinning momentum wheel and connected to a power bus. The inventive system (10) isolates a protected circuit from the power bus (11) in the event of a system power loss and converts and regulates power taken from the kinetic energy stored in the spinning momentum wheel to a voltage sufficient to maintain operation of the protected circuit. In a most general sense, the inventive system includes a power loss detector (21) for detecting a power loss in the system bus and providing a first signal in response thereto and a regulator (26) for regulating the voltage derived from the momentum wheel energy to the protected circuit in response to the first signal.

15 Claims, 3 Drawing Sheets

POWER FAULT PROTECTION FOR HIGH MOMENTUM SYSTEMS

BACKGROUND OF THE INVENTION

Field of the Invention

This invention relates to momentum wheel spacecraft stabilization systems. In particular, the present invention relates to techniques for protecting momentum wheel control circuits and associated systems in the event of a system power loss.

While the present invention is described herein with reference to a particular embodiment, it is understood that the invention is not limited thereto. Those having ordinary skill in the art and access to the teachings provided herein will recognize additional embodiments within the scope thereof.

Description of the Related Art

Spinning momentum wheel systems (formerly called "gyroscope" or "gyro stabilizer") are used to stabilize spacecraft. These systems and other high momentum, electromechanical spacecraft stabilization systems may suffer destructive stress in the event of a sudden loss of power. Such power loss may occur as a result of a short-circuit of the system power mains or primary power bus. Hence, spacecraft and other stabilization systems require protection from destructive stress due to a sudden loss of power on the primary power bus.

Such protection requires some method of blocking, diverting, or non-destructively dissipating the energy stored in the momentum wheel at the time of power loss. This would prevent the possibility of destructive energy dissipation within the momentum wheel motor drive circuitry.

Prior art spacecraft stabilization system protection techniques have generally involved the blocking and/or dissipation of the stored energy. However, these systems have not offered a reliable technique for protecting the system circuitry from some or all of the stored energy. In this context, "reliable" means repeatable with a high degree of success.

Other techniques, reliable in certain ground based applications, have not generally been able to meet the size and/or weight constraints of spacecraft applications. Nor have prior techniques provided for orderly circuit function termination during a power loss event in such a manner as to leave the protected circuit in a known state.

Therefore, a need remains in the art for a lightweight, reliable technique for protecting momentum wheel systems from sudden power loss. The need further exists for a system capable of providing for orderly circuit function termination, during a power loss event, in such a manner as to leave the protected circuit in a known state.

SUMMARY OF THE INVENTION

The need in the art is addressed by the power loss protection system of the present invention which is intended for use in a system having a spinning momentum wheel motor connected to a power bus. The inventive system regulates power applied to a protected circuit connected to the power bus in the event of a system power loss. In a most general sense, the inventive system includes a power loss detector for detecting a power loss in the system bus and providing a first signal in response thereto and a regulator for regulating bus voltage, or back EMF from the momentum wheel motor to the protected circuit in response to the first signal. Thus, the system power bus feed line to the protected circuit becomes a local or secondary bus on which the power is derived from the back EMF of the momentum wheel in accordance with the present invention.

In more specific embodiments, the regulator of the invention includes a circuit for providing a reference voltage and a control circuit for reducing the torque of the spinning momentum wheel. The control circuit includes a circuit for subtracting the secondary bus voltage from the reference voltage and providing a second signal in response thereto and a circuit for reducing the momentum wheel torque in response to the second signal. In a more specific embodiment, the invention includes a switch for electrically isolating the protected circuit from the primary bus in response to the first signal.

Thus, the present invention provides a lightweight, reliable technique for protecting momentum wheel systems from sudden power loss. The invention further provides for orderly circuit function termination, during a power loss event, in such a manner as to leave the protected circuit in a known state.

DETAILED DESCRIPTION OF THE INVENTION

Figure 1:
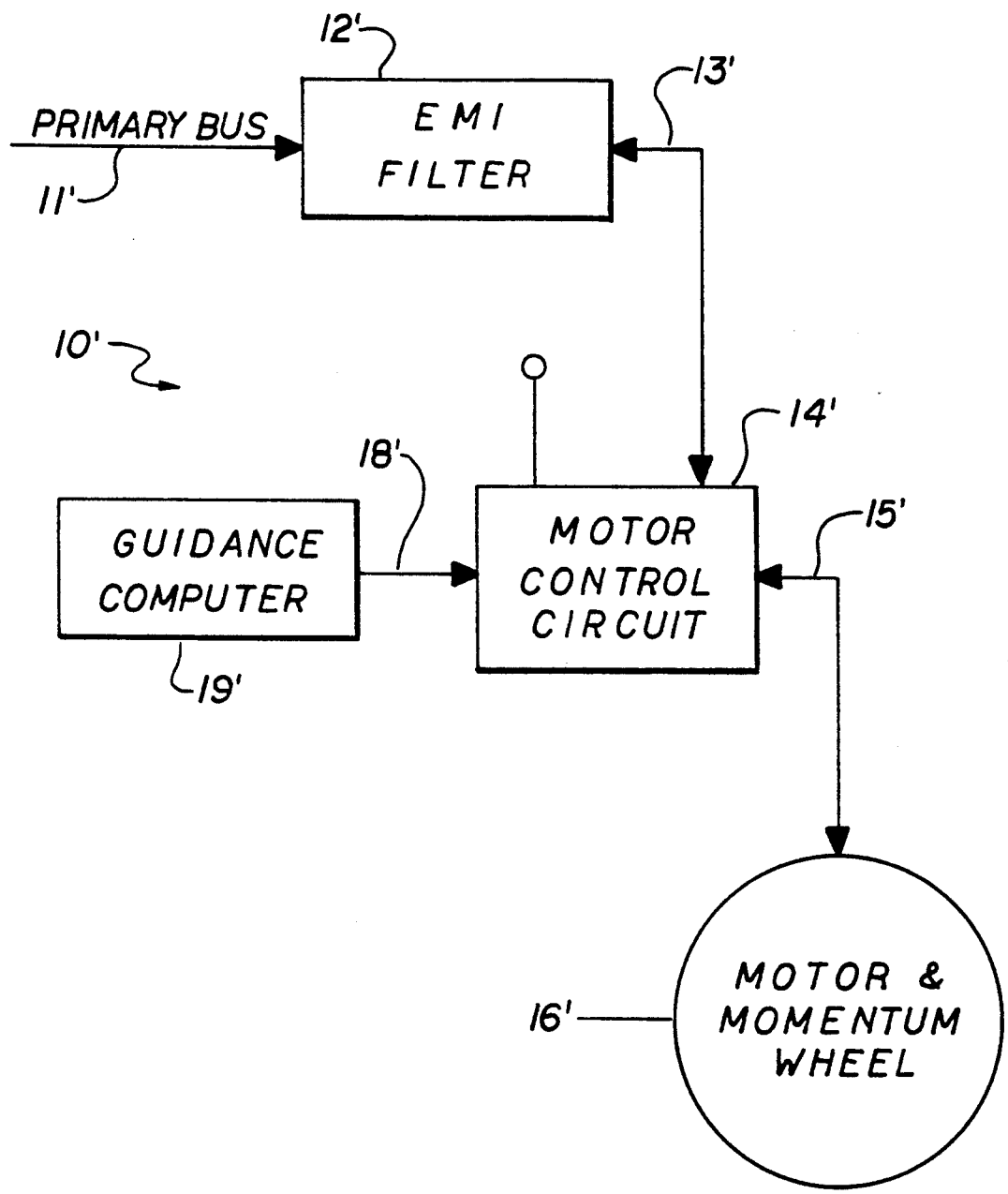
FIG. 1 is a simplified block diagram representation of a conventional momentum wheel control system.

FIG. 1 is a simplified block diagram of a conventional momentum wheel control system 10'. The system 10' is connected to a primary power bus 11' and includes an EMI (electromagnetic interference) filter 12' and a momentum wheel motor control circuit 14'. The motor control circuit 14' is electrically connected to a spinning momentum wheel and motor 16'.

In accordance with conventional teachings, power from the primary power bus 11' is conditioned by the EMI filter 12' to remove unwanted noise. The conditioned power is then directed to the momentum wheel motor control circuit 14' via a secondary power bus 13'. Power applied to the momentum wheel drive motor 16' by the motor control circuit 14', is converted into rotational motion of the momentum wheel by inducing an electromagnetic field in the rotor coil windings (not shown). The field interacts with fixed magnets (not shown) within motor 16' creating a repulsive force which causes the rotor to turn. The rotor is mechanically coupled to the momentum wheel causing it to turn. Thus, the electrical power from the primary power bus 11' is converted into mechanical power.

The reaction torque of the momentum wheel 16' is controlled by the motor control circuit 14' in accordance with signals from an on-board spacecraft guidance computer 19' via a motor torque control line 18'. If the power from the primary power bus 11' is lost, the ability of the control circuit 14' to slow or stop the momentum wheel is also lost. The wheel 16' will remain in motion until the rotational kinetic energy of the spinning rotor and wheel is dissipated through a combination of electrical power consumption and mechanical friction. The rotation of the wheel also maintains rotational motion in the rotor. The rotor coil continues to intersect the magnetic fields of the fixed magnets in the motor inducing a voltage in the coil. This voltage is directed back through the motor control output line 15' to the motor control circuit 14'. With the primary bus at zero or a low voltage, there is nothing to impede a large current flow through the motor control circuit 14'. Also, power bus voltage levels which are below the levels required for proper functioning of the logic circuitry in the motor control circuit 14' leaves that circuit in an undetermined state and vulnerable to possible additional damage. Conventional teachings make no provision for the maintenance of the state of the control circuit 14'.

The present invention redirects and regulates the voltage induced by a spinning momentum wheel and motor combination in a power loss condition of the primary power bus thereby protecting the motor control circuit.

Figure 2:
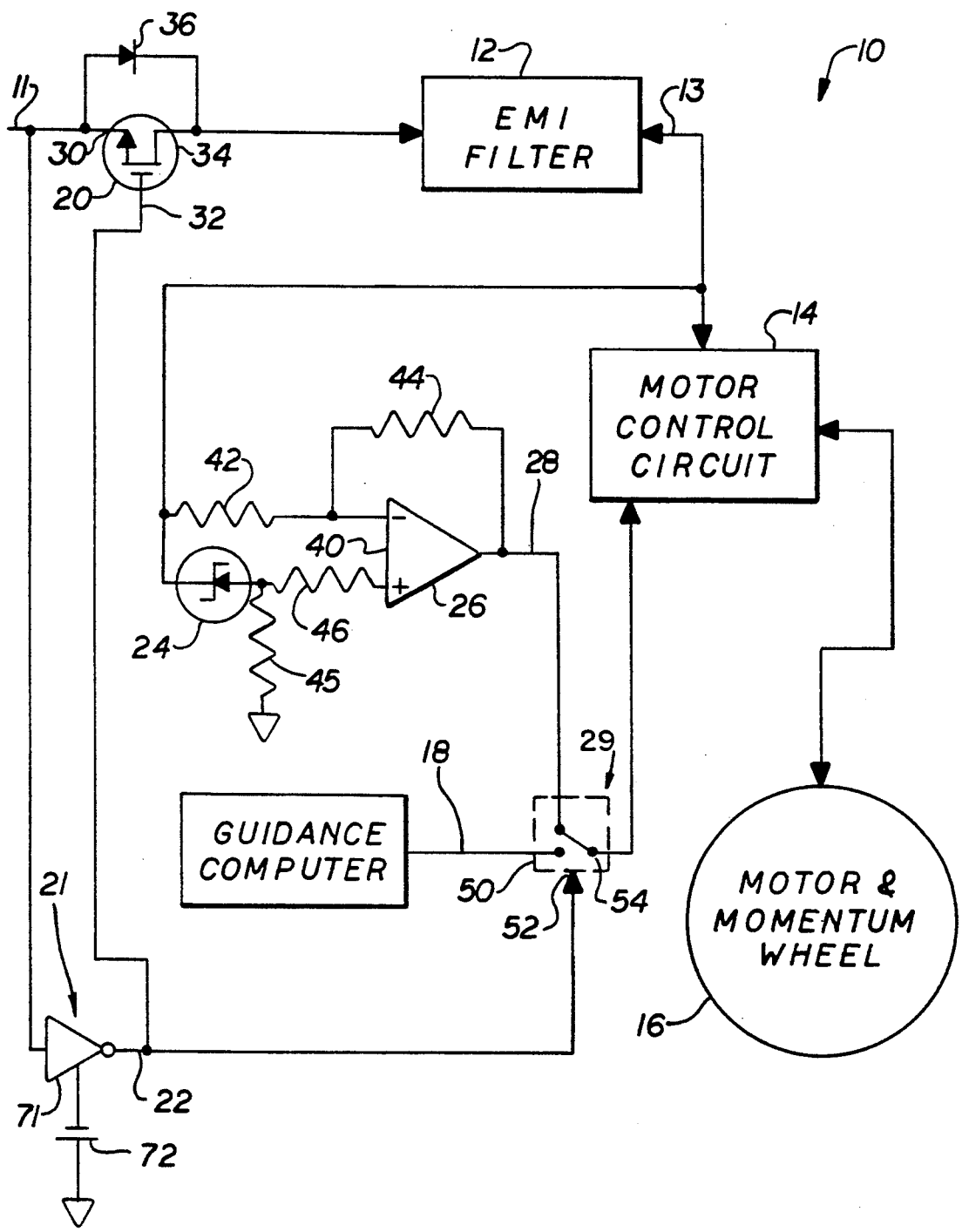
FIG. 2 is a simplified schematic diagram of an illustrative embodiment of the power fault protection system of the present invention.

FIG. 2 is a simplified schematic diagram of an illustrative embodiment of the power loss protection circuit 10 of the present invention. The power loss protection circuit 10 is connected to a primary power bus 11 and includes an EMI filter 12 and a momentum wheel motor control circuit 14. The motor control circuit 14 is connected to a spinning momentum wheel and motor 16. The momentum wheel control circuit 14 includes a power loss detector 21 which sends a signal on line 22 in response thereto. The power loss detector 21 may be implemented by using the CMOS inverter 71. A power loss resulting from a short-circuit condition on the secondary power bus 13 creates a drop in voltage at the input of the inverter. When this voltage falls below one-half ($\frac{1}{2}$) of the voltage of the inverter power-supply battery 72, the output 22 voltage of the inverter will go to a high state, equaling that of the battery 72. The output 22 of the inverter is electrically connected to the gate 32 of MOSFET 20.

In accordance with the teachings of the present invention a differential voltage amplifier 26 is connected between a secondary power bus 13 and a motor speed control line input terminal to the motor control circuit 14. The differential amplifier 26 is comprised of an operational amplifier 40, a first input resistor 42 connected at one end to the inverting input of the amplifier 40, a second input resistor 46 connected at one end to the noninverting input of the amplifier 40, and a feedback resistor 44 connected from the inverting input to the output of the amplifier 40. As is known in the art, operational amplifiers connected in this configuration will amplify the difference between the voltage at resistor 46 and the voltage at resistor 42 and add a small offset voltage inherent in current operational amplifier realizations. The amount of amplification is determined by the ratio of the first input resistor 42 and the feedback resistor 44.

In accordance with the teachings of the present invention, a fixed voltage reference source is provided by a zener diode 24 connected in series between the secondary bus 13 and the second end of the second input resistor 46. A resistor 45 is connected between the anode of the zener diode 24 and ground to act as both a current limiter for the zener diode and a pull-down current path for the noninverting input of the operational amplifier. A positive voltage at the cathode side of the zener diode less than its "knee" or zener voltage will be blocked by the semiconducting property of the diode. The voltage at the noninverting input of the operational amplifier 26 will therefore be zero volts by means of the pull-down path through the resistor 45.

If the voltage on the secondary bus 13 exceeds the zener voltage of the diode 24, the diode will conduct, causing the voltage at the noninverting input of the operational amplifier to equal that of the secondary bus minus the forward voltage drop across the zener diode. The output voltage from the operational amplifier 40 will be proportional to the difference between the voltage on the secondary bus 13 and the voltage at the noninverting input of the operational amplifier 26. Hence, the output voltage will be proportional to the voltage on the zener diode 24.

In accordance with the teachings of the present invention, an analog switch 29 is connected in series with the motor speed control line 18. The analog switch control terminal 52 is connected to the signal line 22. A signal voltage on this line, resulting from a power loss on the primary power bus 11, opens the analog switch 29, blocking signals from the guidance computer 19 to the motor control circuit 14.

In accordance with the present invention, the voltage output from differential amplifier 26 is applied to the motor torque control input of the motor control circuit 14. The voltage is directed to the rotor coil (not shown) of the momentum wheel motor 16 via the motor control circuit 14 and establishes a counteracting magnetic field in the coil thereby creating a braking effect on the momentum wheel. Thus, the present invention regulates a transformation of induced voltage from the momentum wheel to a voltage level on the secondary power bus 13 effective to maintain proper circuit operation.

Voltage on the primary power bus 11 is applied to the source terminal 30 of a MOSFET 20 configured as a voltage controlled switch. The gate terminal 32 of the MOSFET 20 is connected to the output line 22 from the power loss detector 21. The drain terminal of the MOSFET 20 is connected to the input to the EMI filter 12. A diode 36 is connected across the source and drain terminals of the MOSFET 20 and permits normal current flow from the primary bus 11 to the EMI filter 12.

During normal braking operation, reverse current will flow from the EMI filter 12 to the primary bus 11 through the MOSFET 20. In accordance with the teachings of the present invention the output of the power loss detector 21 is connected to the gate 32 of the MOSFET 20. When power is lost to primary power bus 11, as occurs when the bus is shorted to ground, for example, the resulting signal voltage on line 22 is applied to the gate of the MOSFET 20, pinching off the voltage channel between the MOSFET source 32 and the drain 34, effectively isolating and protecting the motor control circuit 14 from the shorted bus.

Figure 3:
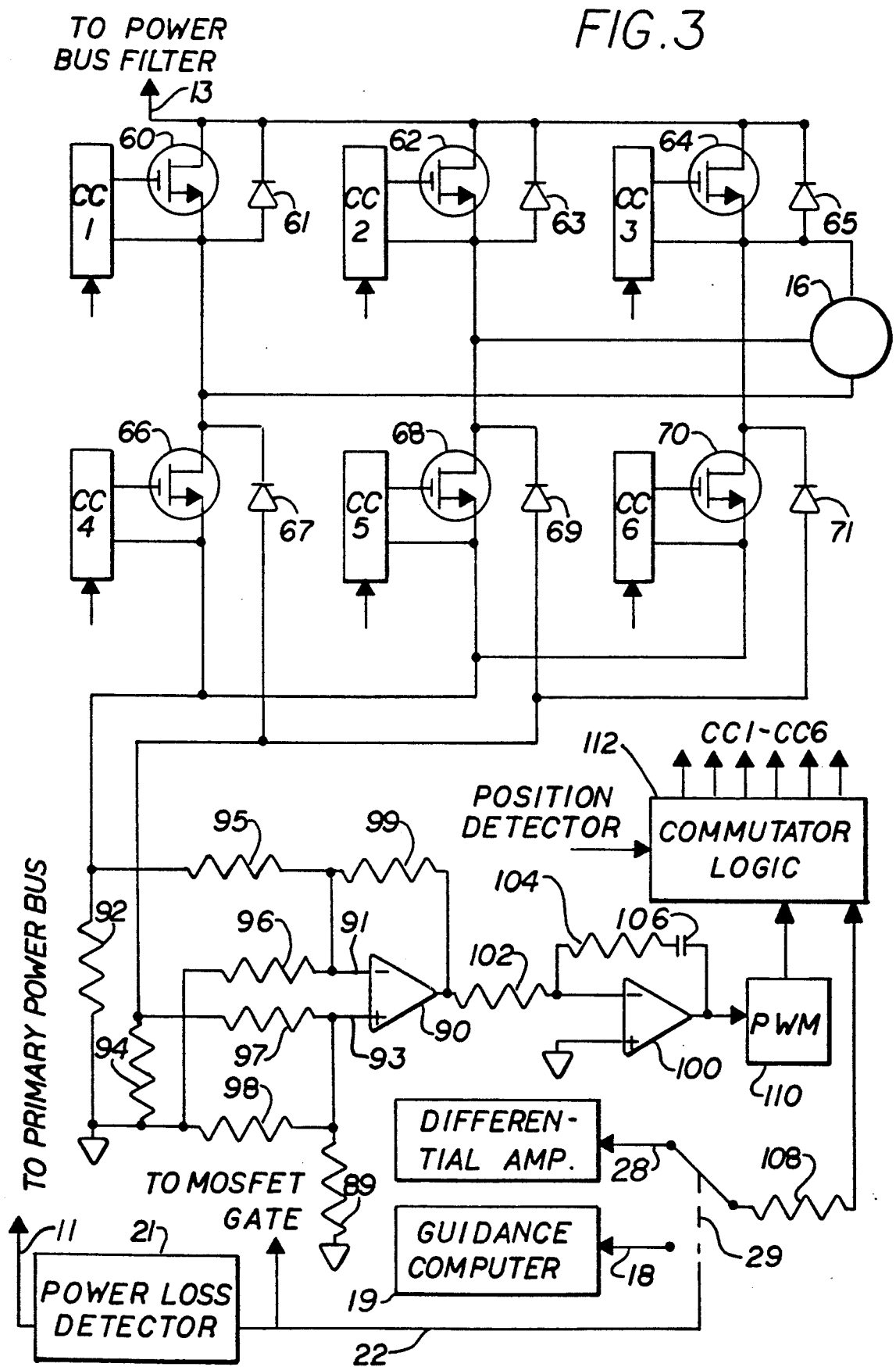
FIG. 3 is a simplified schematic diagram of an illustrative motor control circuit in the power loss protection system of the present invention.

FIG. 3 is a simplified schematic diagram of an illustrative motor control circuit 14 in a power loss protection circuit of the present invention. Current flowing in the motor coils (not shown) is sensed by first and second resistors 92 and 94 and converted to voltages thereby. Third, fourth, fifth and sixth resistors 95 through 98, respectively, form a differential summing network with the inputs of an operational amplifier 90. The voltages on the fifth and sixth resistors 97 and 98 are summed at the noninverting input of the operational amplifier 90. The voltages on the third and fourth resistors 95 and 96 are summed at the inverting input of the operational amplifier 90. These sums are subtracted from one another by the differential inputs of the operational amplifier with a small internal offset voltage. The result is amplified by the ratio of a seventh resistor 99, connected in a feedback loop from the output of the operational amplifier 90 and the inverting input thereof, and the parallel resistance of the third and fourth resistors 95 and 96. The offset voltage is minimized by the addition of an eighth resistor 89 between ground and the noninverting input of the operational amplifier 90. The resulting value of the voltage at the output of the amplifier 90 is proportional to the current in the coils of the motor 16.

The output voltage from the operational amplifier 90 is applied to an input resistor 102 which is connected to the inverting input of a second operational amplifier 100. A feedback resistor 104 is connected in series with a capacitor 106 from the output of the amplifier 100 to the input thereof to maintain circuit stability. Voltage applied to the motor torque line 18 from either the guidance computer of the spacecraft or the differential amplifier of the present invention (not shown) is applied to a resistor 108 which is connected to the noninverting input of operational amplifier 100. The difference between the voltages at the two inputs of the operational amplifier 100 (with a small offset) multiplied by the ratio of the resistors 102 and 104, appears at the output of the amplifier 100.

The output voltage from the amplifier 100 is converted to a pulse train of varying duty cycle by the pulse-width modulator (PWM) 110. Position detectors (not shown) in the motor 16 send a similar varying duty cycle pulse train to the commutator logic circuit 112. The commutator logic circuit 112 will send control signals to charge-control drivers 60 through 70 (even numbers only). The control signals are a combination of the motor torque and position information.

The charge-control drivers 60 through 70 apply the proper voltages to the motor 16 coils to turn the rotor in either a forward or reverse direction. In accordance with the teachings of the present invention, the back EMF generated by the spinning momentum wheel is transformed into a control current in the event of power loss on the primary bus 11 via the differential amplifier circuit 26 as described for FIG. 2, above. This current is similar to the control current that would normally be supplied by the guidance computer to the motor torque control line 18 if a power loss had not occurred. The analog switch 29 changes the connection of the motor torque control line 18 from the output of the guidance computer to the output of the differential amplifier 26 upon loss of power to the primary bus 11.

Therefore the motor control circuit will be protected from either a loss of voltage or uncontrolled voltage fluctuations induced by the momentum wheel motor 16 by transforming the motor-induced voltage to a regulated current and directing the current to the motor torque control input of the motor control circuit 14 via the analog switch 29. As discussed in connection with FIG. 2 above, this is advantageous over techniques which merely isolate the motor torque control circuit from the primary power bus. It allows the commutator logic 112 to remain functional until essentially all the kinetic energy in the momentum wheel has been safely dissipated. This prevents the possibility of erroneous commutation commands from latching multiple charge-control driver transistors in a conducting mode that could subject them to damage.

Thus, a circuit is provided for redirection of power stored in a momentum wheel and the regulation of the power in a manner that protects and maintains the proper functionality of all related system circuitry. While the present invention has been described herein with reference to a particular embodiment for a particular application, those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. In a system having a spinning momentum wheel connected to a power bus, a power loss protection system for regulating power applied to a momentum wheel control circuit connected to said power bus, said power loss protection system comprising:

means for detecting a power loss in said power bus and providing a first signal in response thereto; and means for regulating a secondary bus voltage from said spinning momentum wheel to said momentum wheel control circuit in response to said first signal including a momentum wheel torque controller or regulating the torque of said spinning momentum wheel, wherein said momentum wheel torque controller includes means for providing a reference voltage which includes a zener diode connected between said secondary bus and ground.

2. In a system having a spinning momentum wheel connected to a power bus, a power loss protection system for regulating power applied to a momentum wheel control circuit connected to said power bus, said power loss protection system comprising:

means for detecting a power loss in said power bus and providing a first signal in response thereto; and means for regulating a secondary bus voltage from said spinning momentum wheel to said momentum wheel control circuit in response to said first signal including a momentum wheel torque controller for regulating the torque of said spinning momentum wheel, wherein said momentum wheel torque controller includes means for subtracting said secondary bus voltage from a reference voltage and providing a second signal in response thereto and wherein said means for subtracting said secondary bus voltage from said reference voltage includes an operational amplifier configured as a differential amplifier.

3. The invention of claim 2 wherein said means for providing said seocnd signal includes an analog switch having a first terminal connected to a guidance computer, a second terminal connected for the output of said differential amplifier, a third terminal connected to detect said first signal and a fourth terminal connected to said momentum wheel torque controller.

4. In a system having a spinning momentum wheel connected to a power bus through a momentum wheel control circuit, a power loss protection system for regulating power applied to said momentum wheel control circuit said power loss protection system comprising:

means for detecting a power loss in said power bus and providing a first signal in response thereto;

means for regulating a secondary bus voltage derived from the energy stored in the spinning momentum wheel to said momentum wheel control circuit in response to said first signal, and means for regulating said secondary voltage including:

means for providing a reference voltage;

control means for regulating the torque of said spinning momentum wheel, said control means including means for subtracting said secondary voltage from said reference voltage and providing as second signal in response thereto and means for modifying the spinning momentum wheel torque in response to said second signal; and switch means for electrically isolating said momentum wheel control circuit from the power bus in response to said first signal.

5. A momentum control system comprising:

a momentum wheel for providing a momentum vector;

a power bus for supplying power for driving said momentum wheel;

a momentum wheel control circuit for regulating the power supplied to said momentum wheel from said power bus in response to a torque control signal;

a secondary bus connecting said momentum wheel and said momentum wheel control circuit;

a power loss detector for detecting a loss of power in said power bus and generating a first signal in response thereto; and a momentum wheel torque controller in communication with said momentum wheel control circuit for generating a torque control signal in response to said first signal for regulating the voltage produced by said momentum wheel on said secondary bus.

6. The invention of claim 5 further comprising:

a guidance computer for generating a torque control signal in the absence of said first signal; and a switch for alternatively coupling said momentum wheel control circuit to either of said torque controller or to said guidance computer in response ti said first signal.

7. The invention of claim 6 wherein said switch comprises a voltage controlled transistor for detecting and responding to said first signal.

8. The invention of claim 5 wherein said momentum wheel torque controller comprises a reference voltage generator for generating a reference voltage and a comparator for generating said torque control signal in response to a comparison of the reference voltage to the voltage on said secondary bus.

9. The invention of claim 8 wherein said comparator comprises a subtraction circuit.

10. The invention of claim 5 further comprising an isolation switch for isolating said power bus from said momentum wheel, said momentum wheel control circuit, and said momentum wheel torque controller in response to said first signal.

11. The invention of claim 5 wherein said momentum wheel control circuit is set in a known state upon said secondary bus voltage becoming insufficient to drive said momentum wheel torque controller.

12. In a momentum wheel control system having a momentum wheel, a power bus for supplying power for driving said momentum wheel and a momentum wheel control circuit for regulating the power supplied to said momentum wheel from said power bus, a method for protecting the momentum wheel control circuit from voltages produced by said momentum wheel comprising:

detecting a loss of power in said power bus;

generating a first signal in response to the detection of a power loss;

generating a torque control signal in response to said first signal and in response to the voltage produced by said momentum wheel; and applying said torque control signal to said momentum wheel control circuit for regulating the torque of said momentum wheel.

13. The invention of claim 12 wherein the system further comprises a guidance computer for regulating the torque of said momentum wheel in the absence of said first signal, the method further comprising the steps of uncoupling said momentum wheel control circuit from said guidance computer in response to said first signal.

14. The invention of claim 12 further comprising the step of isolating said power bus from said momentum wheel and said momentum wheel control circuit in response to said first signal.

15. The invention of claim 12 wherein said step of applying said torque control signal comprises setting said momentum wheel control circuit in a known state.

* * * * *

UNITED STATES PATENT AND TRADEMARK OFFICE
CERTIFICATE OF CORRECTION

PATENT NO. : 5,227,943
DATED : July 13, 1993
INVENTOR(S) : Donald R. Cargille It is certified that error appears in the above-identified patent and that said Letters Patent is hereby corrected as shown below:

Claim 1, line 29 should read "including a momentum wheel torque controller for"

Claim 3, line 56 should read "second"

Claim 3, line 58 should read "a second terminal connected to"

Claim 4, line 10 should read "and providing a"

Claim 6, line 40 should read "in response to"

Claim 13, line 36 should read "comprising the step"

Signed and Sealed this

Twenty-third Day of August, 1994

Attest:

BRUCE LEHMAN

*Attesting Officer*   *Commissioner of Patents and Trademarks*